(12) United States Patent
Keene

(10) Patent No.: US 7,414,404 B2
(45) Date of Patent: Aug. 19, 2008

(54) METAL DETECTION APPARATUS

(75) Inventor: Mark N Keene, Malvern Worcs (GB)

(73) Assignee: QinetiQ Limited, Farnborough, Hants (GB)

( * ) Notice: Subject to any disclaimer, the term of this patent is extended or adjusted under 35 U.S.C. 154(b) by 715 days.

(21) Appl. No.: 10/492,959

(22) PCT Filed: Sep. 23, 2002

(86) PCT No.: PCT/GB02/04313

§ 371 (c)(1),
(2), (4) Date: Apr. 19, 2004

(87) PCT Pub. No.: WO03/034095

PCT Pub. Date: Apr. 24, 2003

(65) Prior Publication Data

US 2004/0260174 A1 Dec. 23, 2004

(30) Foreign Application Priority Data

Oct. 17, 2001 (GB) ................................. 0124887.1

(51) Int. Cl.
*G01V 3/08* (2006.01)
(52) U.S. Cl. .................. 324/329; 324/243; 324/244; 324/247; 600/424
(58) Field of Classification Search .............. 600/407, 600/424; 320/244
See application file for complete search history.

(56) References Cited

U.S. PATENT DOCUMENTS

| 2,129,058 | A |   | 9/1938 | Hedden |  |
|---|---|---|---|---|---|
| 4,837,489 | A |   | 6/1989 | McFee |  |
| 5,148,108 | A |   | 9/1992 | Dufour |  |
| 5,245,307 | A |   | 9/1993 | Klaus et al. |  |
| 5,367,259 | A | * | 11/1994 | Matsumoto et al. | 324/248 |
| 5,842,986 | A | * | 12/1998 | Avrin et al. | 600/407 |
| 6,541,966 | B1 | * | 4/2003 | Keene | 324/243 |

FOREIGN PATENT DOCUMENTS

| DE | 36 15 652 A | 11/1987 |
|---|---|---|
| EP | 0 249 110 A | 12/1987 |
| GB | 2357853 A | 7/2001 |
| WO | 85/00666 A | 2/1985 |
| WO | 96/11414 A1 | 4/1996 |
| WO | 97/49334 A1 | 12/1997 |
| WO | 00/00848 A | 1/2000 |

* cited by examiner

*Primary Examiner*—Brian L. Casler
*Assistant Examiner*—Ellsworth Weatherby
(74) *Attorney, Agent, or Firm*—Nixon & Vanderhye P.C.

(57) ABSTRACT

A metal detection apparatus includes a transmitter for generating a magnetic field in the vicinity of the metal object, and a detector for detecting a secondary magnetic field. The detector include a first gradiometer for providing a first output signal representative of a first direction, y, to the metal object, a second gradiometer arranged substantially orthogonal to the first gradiometer for providing a second output signal representative of a second direction, x, to the metal object, the second direction being substantially orthogonal to the first direction and in the same plane as the first direction, and an outer coil and an inner coil arranged to be substantially concentric with one another and each of which is arranged to provide an output signal representative of secondary magnetic field strength in a third direction, z, which is substantially orthogonal to the plane of the first and second directions.

20 Claims, 8 Drawing Sheets

METAL DETECTION APPARATUS

This application is the US national phase of international application PCT/GB02/04313 filed in English on 23 Sep. 2002, which designated the US. PCT/GB02/04313 claims priority to GB Application No. 0124887.1 filed 17 Oct. 2001. The entire contents of these applications are incorporated herein by reference.

This invention relates to an apparatus for detecting metals. In particular, the invention relates to a metal detection apparatus suitable for use in locating metal objects in a human or animal body as an aid to surgery.

The term, 'metal detector' usually refers to a class of instruments where a coil is energised with a changing electrical current which induces small "eddy currents" in any nearby metal through a process of magnetic induction. The induced eddy currents have their own associated magnetic fields that are detected, usually with coils, mounted on the detector. There are two main types of metal detector; the pulse-induction (p-i) and the continuous wave.

Pulse-induction (p-i) detectors use a square wave (or alternative shape which has a sharp edge) signal in the transmitter coil. The high rate-of-change of magnetic field creates a voltage pulse in any nearby metal. This pulse generates an eddy current which decays in time. The receiver coil is gated to look for the eddy current associated with this decay at a specified time, and for a specified duration, after the edge in the transmit cycle.

Continuous wave (c/w) detectors use a sinusoidal a.c. electrical current in their transmitter coil to establish an a.c. magnetic field. A receiver coil, which is sensitive to signals at the same frequency as the transmitter signal, detects the presence of eddy currents within any nearby metal.

It has been proposed to use metal detection apparatus in surgery to locate foreign objects in the human body. It is a requirement for such techniques to be able to locate the metal objects as accurately as possible so as to minimise damage caused to the skin and other organs during surgery, and to minimise surgical scaring.

PCT application WO 97/49334, and also WO 97/49334, describe a metal detection apparatus which enables the accurate characterisation of metal objects, in metal type, shape and three dimensional location. The apparatus includes five sets of gradiometric receiver coil pairs, which are wound in opposite polarity to one another and are usually wired in series so that uniform magnetic fields create equal and opposite fields which cancel. Each of the gradiometric coil pairs is arranged to measure a different one of five independent first order magnetic field gradients. A sensor is also provided to measure the magnetic field component which is required to locate the three dimensional position of the metal to be detected. The five gradient signals from the gradiometer pairs are processed using an Adaptive Signal Processing Algorithm to improve the signal quality, and an inversion algorithm to determine the three-dimensional position of the metal and its electromagnetic cross-section.

Although accurate three-dimensional location of a metal object is important in surgical applications, the characterisation of the metal is less important as usually the only requirement is that the metal object is removed, irrespective of its precise shape and metal type. The metal detection apparatus described in PCT/GB99/01847 and WO 97/49334 therefore provides more information than is absolutely necessary, and is a relatively expensive apparatus for providing a three dimensional position location of a metal object, particularly as it requires the use of a computationally intensive processing algorithm.

By way of background to the present invention, PCT application WO 96/11414 also relates to a metal detection apparatus which is concerned with the detection of metal objects buried beneath the surface of the ground. The apparatus includes two gradiometer coil pairs, a first one of the pairs being oriented in a measurement plane perpendicular to the measurement plane of a second one of the pairs. The two gradiometer pairs are operated with a common exciter coil which is excited at two or more frequencies, and each of the gradiometer pairs generates an output signal which are then used to provide two dimensional position information of the metal object. These sensors are rotated about a central hub at a constant rate.

The metal detection apparatus is intended for use on a vehicle and, as the vehicle travels across the ground, the output signals from the two pairs of orthoganally arranged gradiometer coil pairs are manipulated in software to provide an image which shows the two-dimensional location (i.e. x-y coordinates) of metal objects beneath the surface of the ground over which the vehicle moves. The speed at which the sensors am moving is used to estimate the depth at which metal objects are buried (i.e. z coordinate) by interrogating the output signals from the gradiometer coil pairs. However, the determination of the x, y and z position information involves a computationally intensive process and requires speed sensors to continuously measure the speed of the vehicle, and to monitor the rotation rate of the sensor system.

By way of further general background to the present invention, DE 36 15 652 and U.S. Pat. No. 2,129,058 also describe metal detection apparatus.

It is an object of the present invention to provide a metal detection apparatus which is convenient for use in surgery and which provides accurate location of foreign metal objects in the human or animal body. It is a further aspect of the invention to enable this to be achieved without the need to continually move the sensor.

According to the present invention, an apparatus for detecting a metal object beneath a surface of a human or animal body comprises transmitter means for generating a magnetic field in the vicinity of the metal object, thereby to generate a secondary magnetic field, and detection means for detecting the secondary magnetic field, wherein the detection means include a first gradiometer having first and second gradiometer coils wound in opposite polarity to one another in series in a figure-of-eight configuration about a clearance region for providing a first output signal representative of a first direction, y, to the metal object, a second gradiometer having first and second gradiometer coils wound in opposite polarity to one another in series in a figure-of-eight configuration about a clearance region arranged substantially orthogonal to the first gradiometer for providing a second output signal representative of a second direction, x, to the metal object, the second direction being substantially orthogonal to the first direction and in the same plane as the first direction, an outer coil and an inner coil arranged to be substantially concentric with one another, each of the outer and inner coils being arranged to provide an output signal representative of secondary magnetic field strength in a third direction, z, which is substantially orthogonal to the plane of the first and second dictions, and processing means for conks the output signal generated by the inner coil with the output signal generated by the outer coil so as to provide an indication of depth, d, of the metal object beneath the surface, the inner and outer coils and the clearance regions of the first and second gradiometers being arranged about a common axis in the third direction to define an access channel within which a device is received, in use, for marking the surface of the body, the apparatus being capable, in use, of simultaneously indicating the depth of the metal object beneath the surface of the body and marking the surface there-above.

In a preferred embodiment, the apparatus includes an outer coil set including an upper outer coil and a lower outer coil spaced apart in the third direction, and and inner coil set including an upper inner coil and a lower inner coil, each of which is arranged to be substantially concentric with a corresponding upper or lower one of the outer coils, each of the outer and inner coil sets providing an output signal representative of secondary field strength at a position of the associated coil in the third direction. It will be appreciated, however, that only single upper coil is required for the purpose of calculating the depth, d.

The present invention provides a relatively inexpensive and lightweight metal detection apparatus for locating a metal object in a human or animal body which can readily be designed as a hand held unit for surgical use. A particular advantage is the only one digital processing channel is required to enable the position of the metal in the third direction (i.e. a depth measurement) to be determined, thereby reducing processor power requirements. The advantage derives from the fact that the apparatus does not require a numerical calculation of the x-y location of the metal body to be detected, rather a relatively simple visual indication that guides the user to direct the sensor to a top-dead-centre position over the metal object in the x-y plane.

Preferably, the first gradiometer includes first and second gradiometer coils wound in either a separated or overlapped figure-of-eight configuration Preferably, the second gradiometer includes first and second gradiometer coils wound in either a separated or an overlapped figure-of-eight configuration, and oriented substantially orthogonally to the first gradiometer in the plane of the first gradiometer.

In a preferred embodiment, the coils of both the first and second gradiometers are wound in the same overlapped or separated configuration.

The transmitter means may comprise means for generating a pulsed or an alternating magnetic field.

It will be appreciated that the device for marking the surface of the body may, but need not, form part of the metal detection apparatus.

In a preferred embodiment of the present invention, the metal detection apparatus includes a display comprising a two dimensional array of display elements for providing a visual indication of the position of the metal object in the x-y plane.

In one embodiment, the display may comprise an array of light emitting diodes (LEDs). The LEDs may be shaped in the form of arrows or direction guides to further aid guidance of the user to move the apparatus to a top-dead-centre position substantially vertically above the metal object.

In a further preferred embodiment, the apparatus includes a first comparison means for comparing the output signal from the first gradiometer with substantially equal value positive and negative threshold levels and for generating first and second comparative output signals, and a second comparison means for comparing the output signal from the second gradiometer with substantially equal value positive and negative threshold levels and for generating first and second further comparative output signals, and means for activating the display elements in response to the comparative output signals to provide a visual indication of the distance to the metal object in an x-y plane.

Preferably, the threshold levels associated with both the first and second gradiometers are substantially equal.

In order to provide a higher resolution display, the apparatus may also include a logic gate array for receiving the comparative output signals and for generating a plurality of output signals for activating the display elements in accordance with one or more predetermined logic statements.

Preferably, the apparatus also includes digital processing means for receiving each of the output signals from the inner and outer coils and calculating the depth, d, of the metal object beneath the surface of the body.

In a further preferred embodiment, the signal processing means is arranged to determine the depth, d, of the metal object only when the metal detection apparatus is moved into a position in which the metal object is substantially vertically beneath the current x-y position of the metal detection apparatus.

The signal processing means may be arranged to calculate the depth, d, in real time, or may include a look up table or data map having pre-stored calibrated data.

Preferably, the display is also provided with a graphical display for displaying a numerical indication of the depth, d, of the metal object.

The invention will now be described, by way of example only, with reference to the following figures in which.

Figure 5:
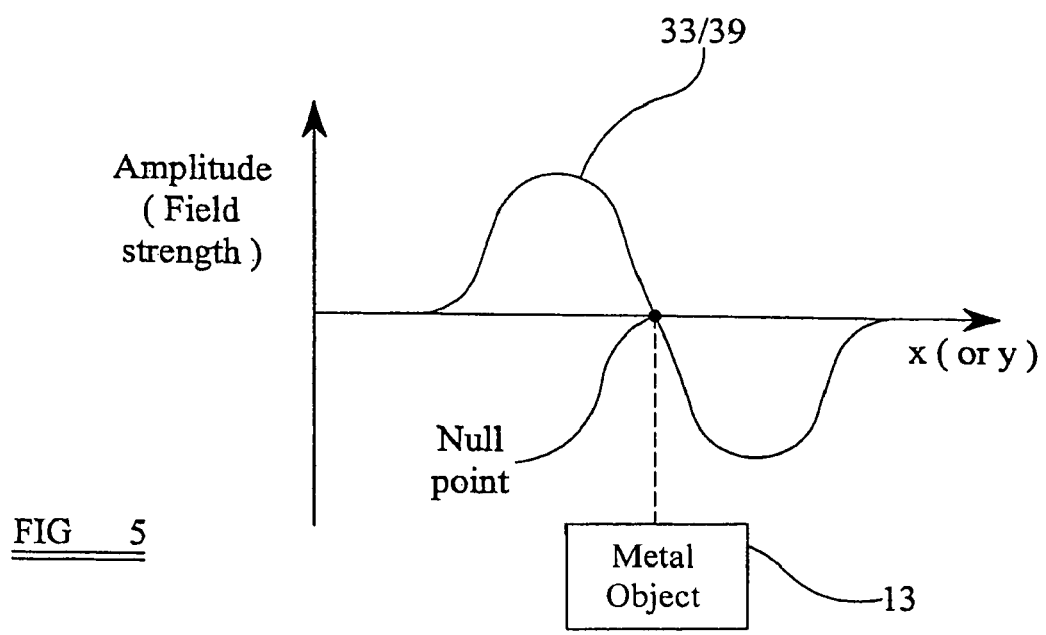
Figure 3:
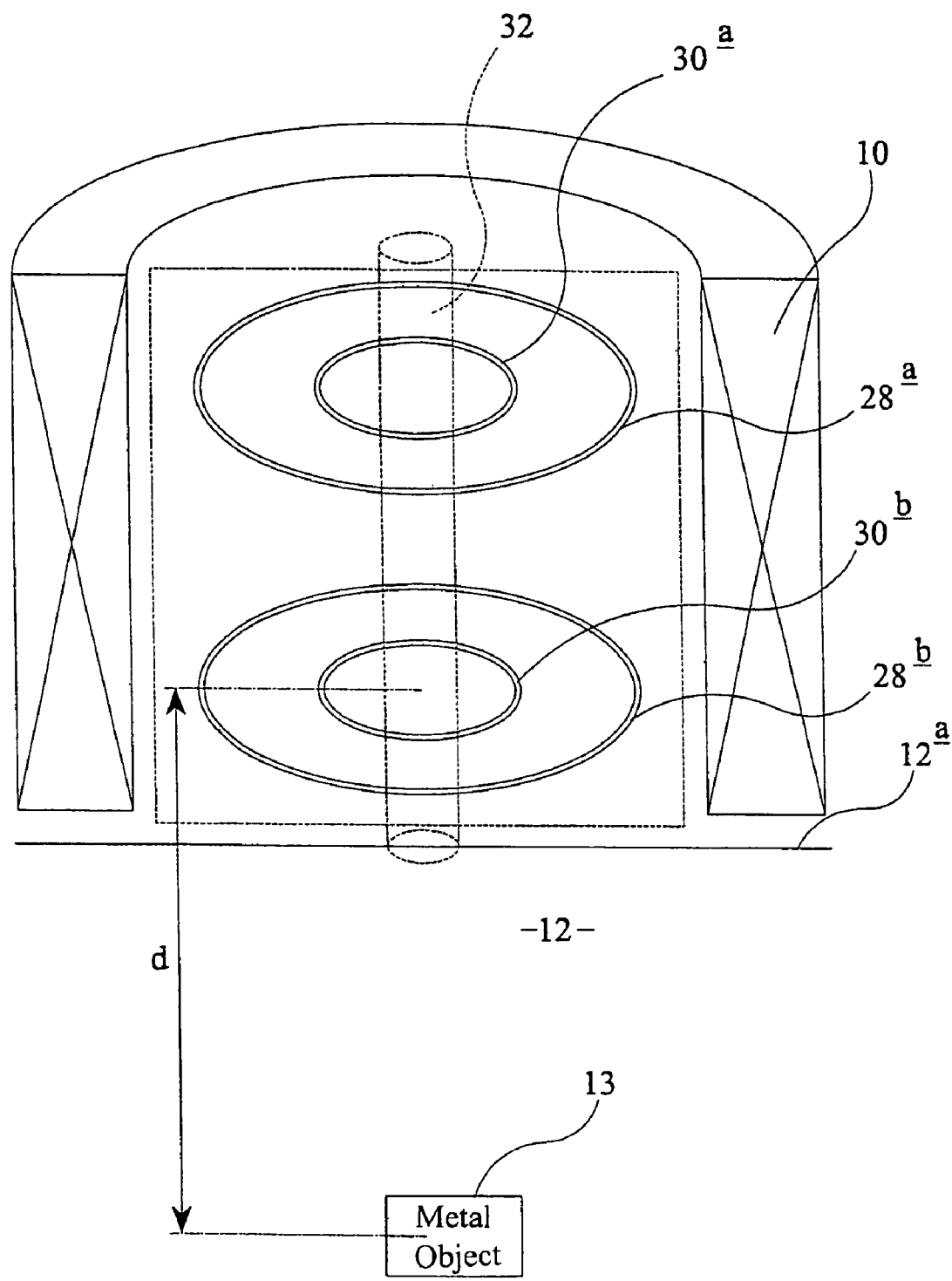
Figure 4:
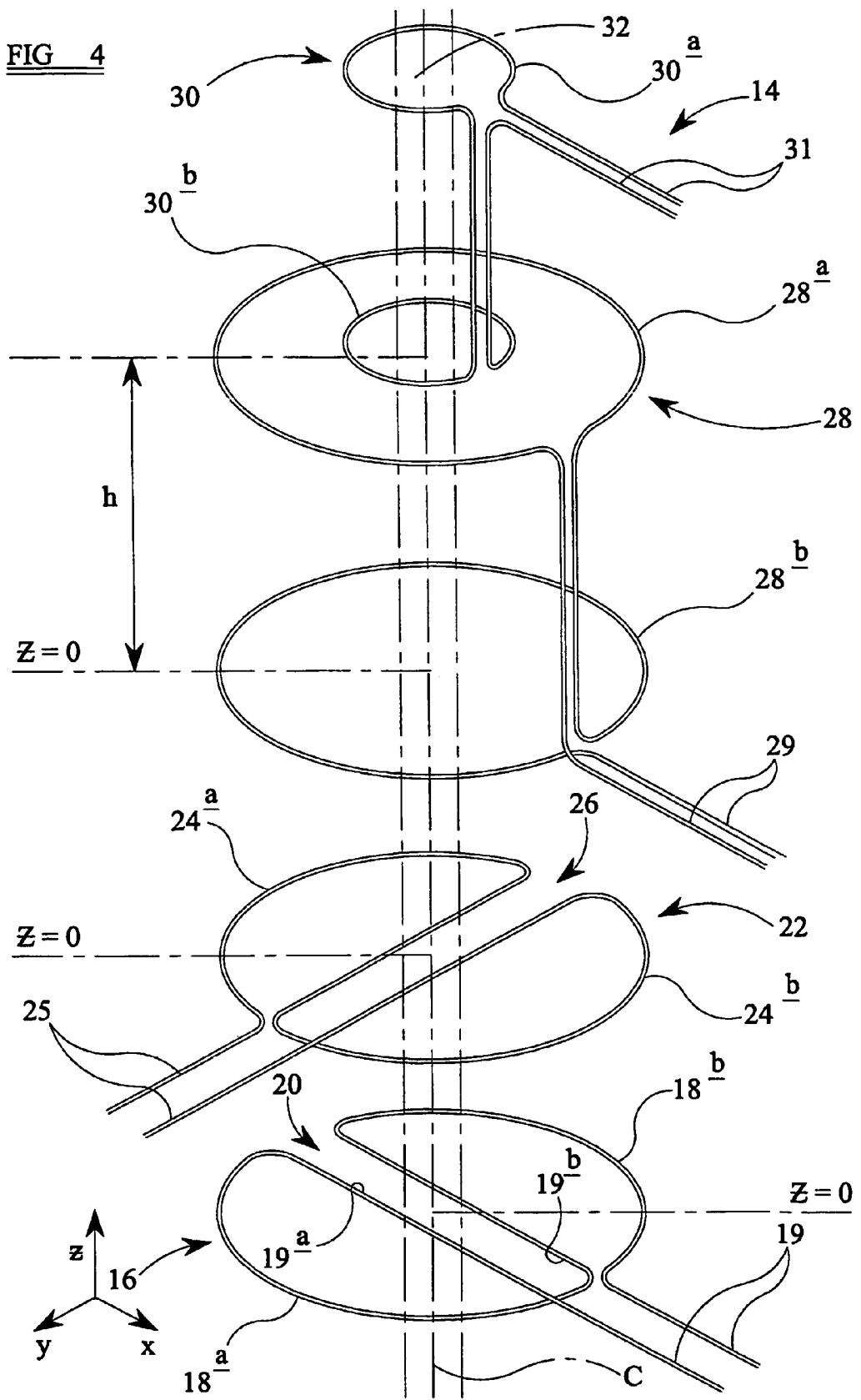
Figure 6:
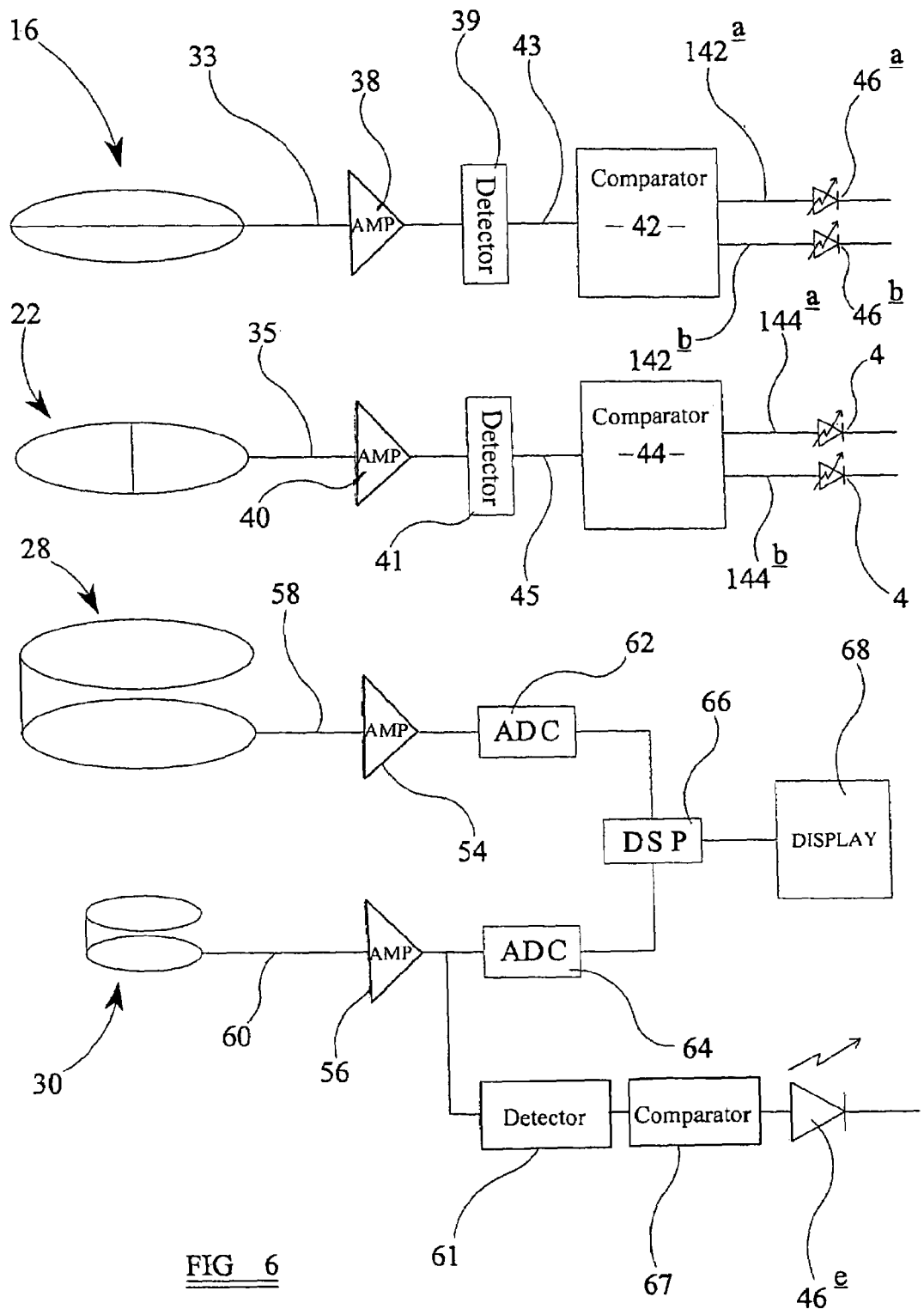
Figure 7:
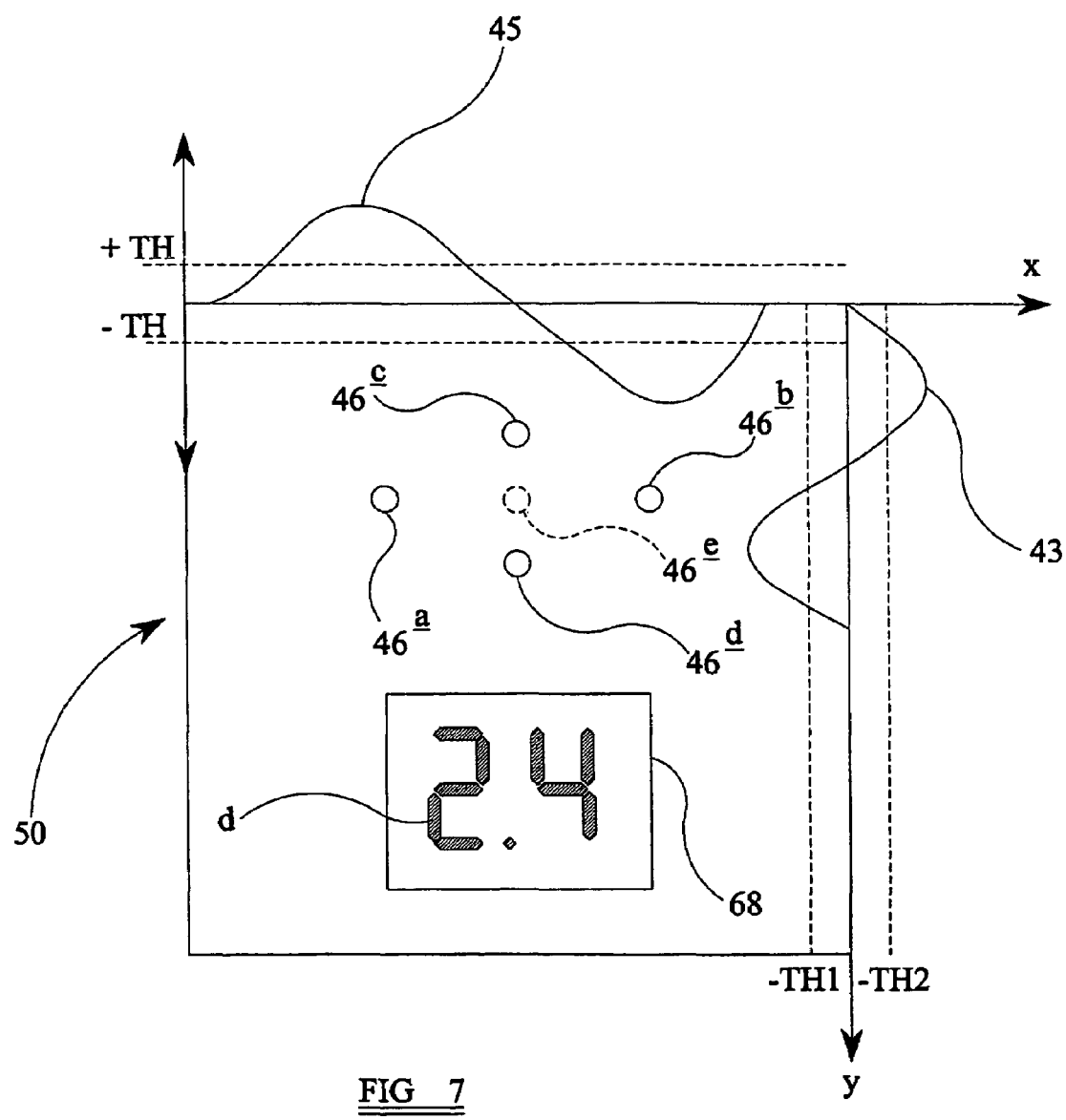

FIG. 3 is a schematic diagram of the metal detection apparatus of the present invention, FIG. 4 is an expanded, perspective view of the detection coils of the metal detection apparatus of the present invention, FIG. 5 is a graph to illustrate the output signal from a first pair of gradiometer coils forming part of the detection apparatus in FIG. 4, FIG. 6 is a schematic diagram of a processing arrangement forming part of the metal detection apparatus in FIGS. 3 and 4, FIG. 7 is a schematic view of a display forming part of the metal detection apparatus in FIG. 3, 4 and 6.

Figure 8:
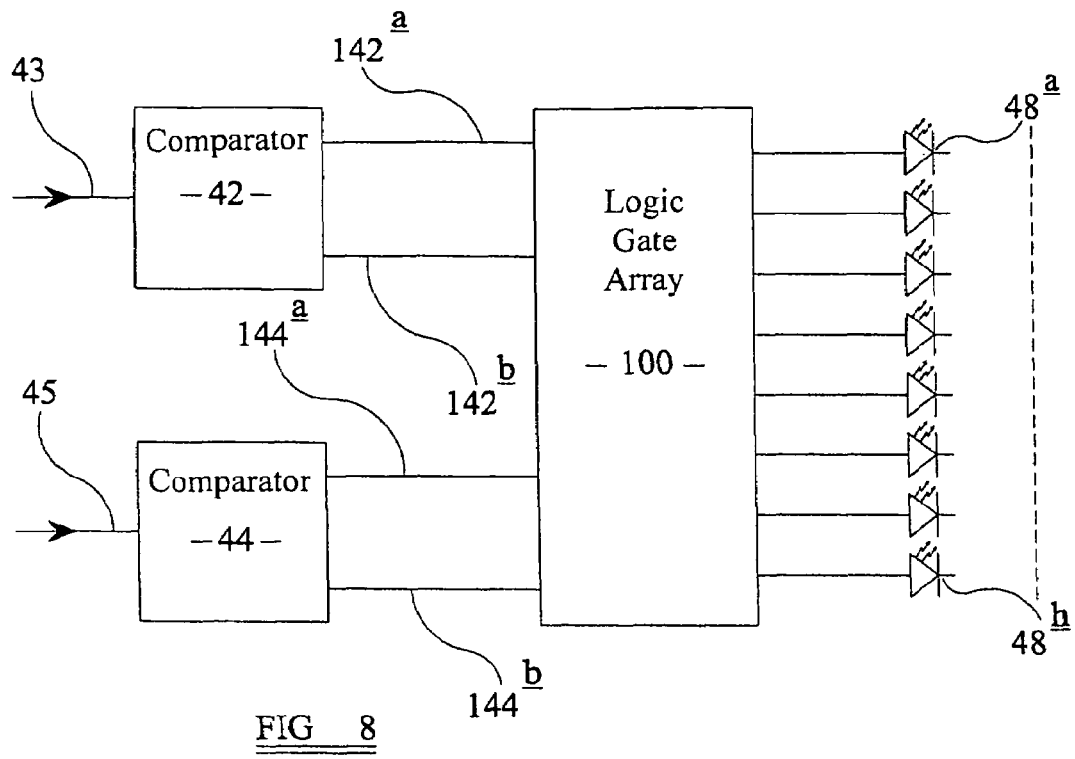
Figure 9:
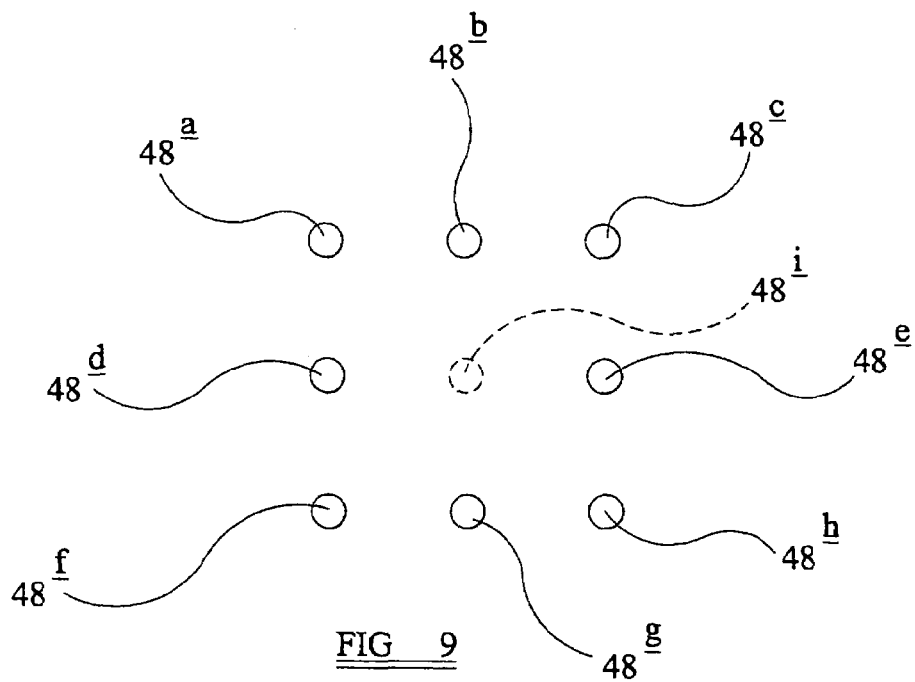
Figure 10:
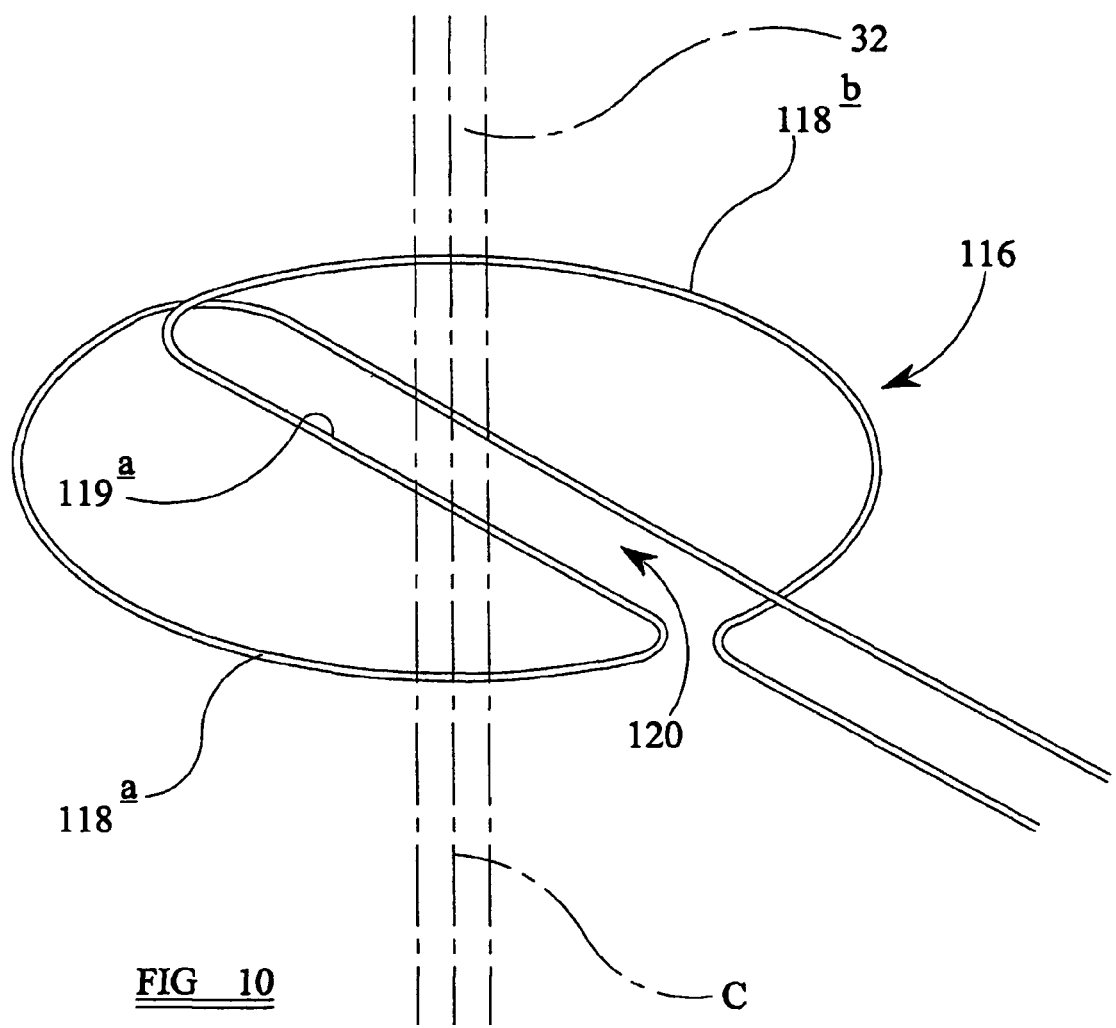

FIG. 8 is a schematic diagram of a part of a processing arrangement of an alternative embodiment of the invention, FIG. 9 is a schematic view of a display for use with the processing arrangement in FIG. 8, and FIG. 10 is a perspective view of an alternative arrangement of a pair of gradiometer coils to that shown in FIG. 4.

By way of background and to aid the understanding of the present invention, the basic principles of conventional p-i and c/w detectors will be described with reference to FIGS. 1 and 2 respectively. For the purpose of this specification, the phrase "detection of a metal" is taken to mean that a metal is observed to be within a relatively large volume of space whereas the term "location of a metal" is used to mean a more precise indication of the position of the metal within the larger volume.

Figure 1:
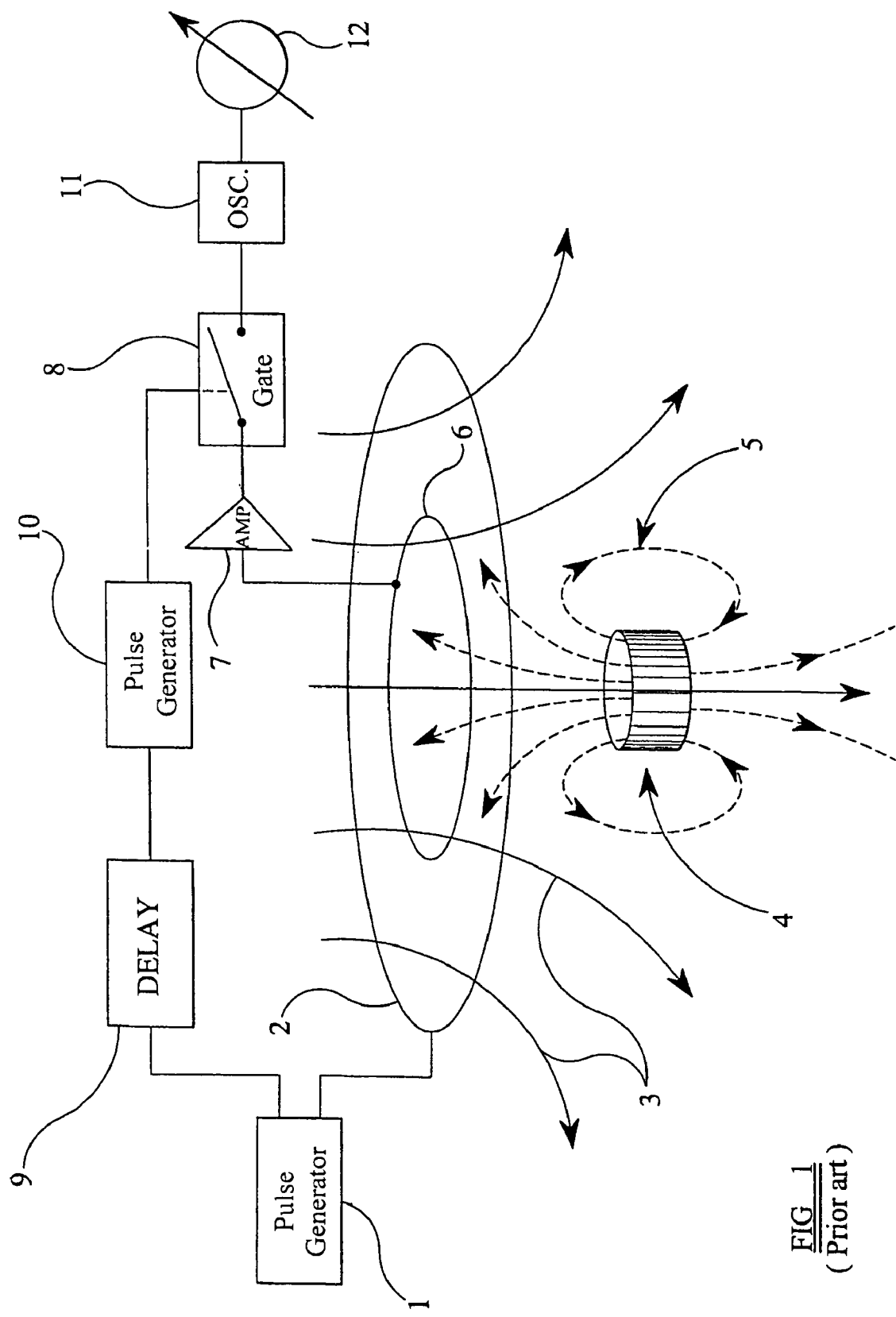
FIG. 1 is a schematic diagram of a known pulse-induction (p-i) metal detector.

Referring to FIG. 1, a conventional p-i detector uses a pulse generator 1 to apply a current pulse to a transmitter coil 2. This generates a pulsed magnetic field 3 which may fall incident upon a metal 4. If so, the metal 4 will be induced with an eddy current which will decay to zero some time after the energising pulse has switched. This decaying eddy current will generate a secondary magnetic field 5 (shown as a dashed line) which may thread the receiver coil 6 and be amplified by an amplifier 7. This signal is passed through a gate 8 which is opened for a short time after the energising pulse has switched. This may be accomplished by using a time delay 9 which is triggered by the pulse from the transmitter 1, and a pulse generator 10 to specify the length of time for which the gate 8 is open. The function of the gate 8 is to block the directly received transmitter pulse and yet sense the low level secondary field 6 decaying with time. The output of the gate 8 is integrated using an integrator 11. The integrator 11 sums the cumulative signal over several pulses and outputs this signal to a meter 12 or other indicator.

Figure 2:
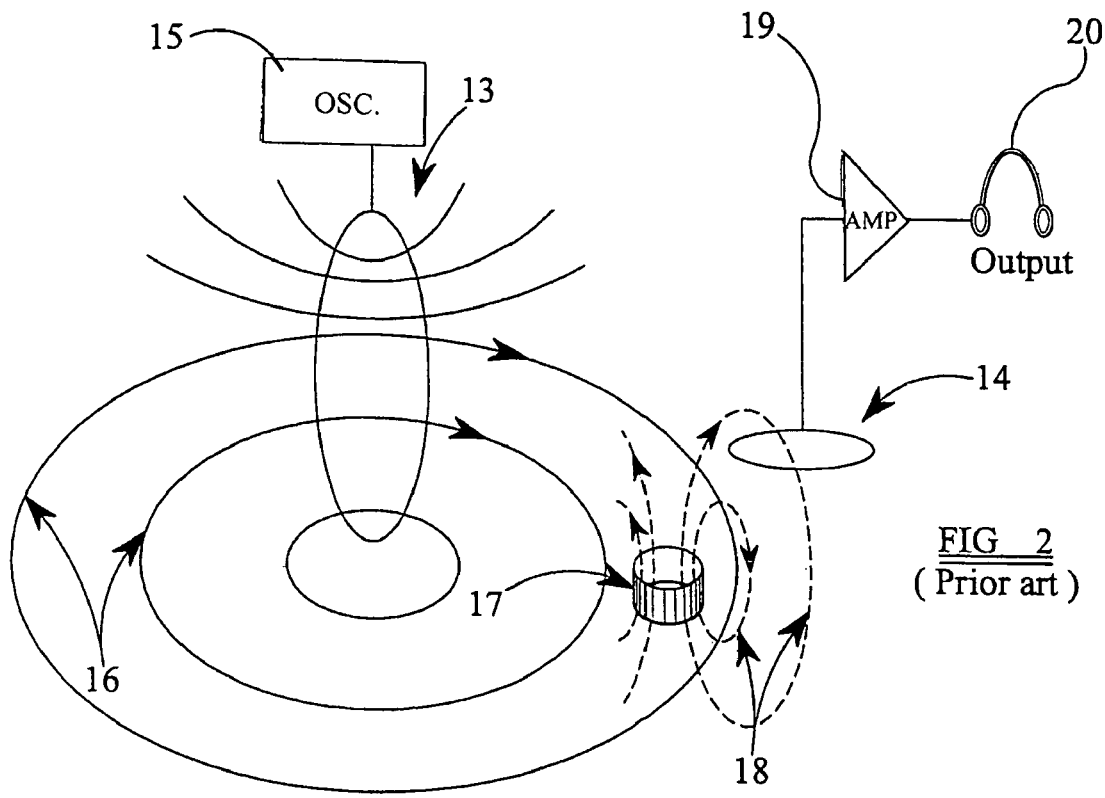
FIG. 2 is a schematic diagram of a known continuous-wave (c/w) metal detector.

Referring to FIG. 2, a conventional c/w detector comprises a transmitter coil 13 and a receiver coil 14. The transmitter coil 13 is supplied by an alternating current from an oscillator 15. In this example the receiver coil 14 is arranged in an orthogonal direction to the transmitter coil and positioned so that in the absence of a metal no net magnetic field 16 threads it. When there is a metal 17 present the induced current establishes a secondary field 18 (shown as dashed lines) which is received by the receiver coil 14, amplified by an amplifier 19 and output at 20.

Referring to FIG. 3, the metal detection apparatus of the present invention includes a set of transmitter coils 10 for generating a magnetic field to irradiate a human or animal body 12. The transmitter coils may operate in pulsed or continuous wave mode. The transmitter coils 10 surround a detection coil arrangement, referred to generally as 14 and identified by dashed lines. Conveniently, the transmitter coils 10 and the detection coil arrangement 14 are sized such that the apparatus can be held in the hand of a surgeon and can be brought in close proximity with a surface 12a of the body 12 to be operated on. It will be appreciated that, for illustration purposes, only a part circular section of the transmitter coils 10 is shown in FIG. 3, but in practice the coils 10 are wound to fully surround the detection coil arrangement 14.

Referring to FIG. 4, the detection coil arrangement 14 includes a first pair of coils, referred to as a "gradiometer" 16, formed from a single wire wound in a "figure of eight" configuration to define first and second coil halves 18a, 18b of part circular form. Substantially parallel, facing edges of each of the first and second coils 18a, 18b of the first gradiometer 16 define a clearance 20 between them. The coils 18a, 18b are said to be in a "separated" configuration as the area defined by one coil half does not overlap the area defined by the other coil half. The coils 18a, 18b are wound in opposite polarity to one another and in series such that the gradiometer 16 is only sensitive to the difference in magnetic field between the two coil halves 18a, 18b. The detection coil arrangement 14 also includes a second gradiometer 22 formed from a single wire wound to form further first and second coil halves 24a, 24b in an identical manner to the first gradiometer 16, a clearance 26 being defined between parallel facing edges of the second coils 24a, 24b. The coils of the first and second gradiometers 16, 22 are oriented such that they are orthogonal to one another in a common x-y plane horizontal to the surface 12a of the body. The secondary magnetic field, B, generated by eddy currents and/or sympathetic magnetisation induced in the metal body 13 by the transmitted field has components, Bx, By, Bz, in the x, y and z planes respectively. The first gradiometer 16 is oriented to measure a magnetic field gradient component, dBz/dy, and the second gradiometer 22 is oriented to measure a magnetic field gradient component, dBz/dx. Voltage output signals which are representative of the aforementioned magnetic field gradient components are measured across respective wire ends 19, 25 of the first and second gradiometers 16, 22 respectively and are supplied to a processing arrangement, as will be described in further detail hereinafter.

For clarity, only a single turn for each coil is shown in FIG. 4 but, in practice, it is desirable that each coil has several coils so as to increase the strength of the measured signal.

The detection coil arrangement 14 also includes an out-of-plane detection coil gradiometric arrangement including a first set of outer coils 28 and a second set of inner coils 30. The outer coil arrangement 28 includes a first outer coil 28a and a second outer coil 28b, both of which are of substantially equal diameter. The first and second outer coils 28a, 28b are wound from a single wire and are spaced apart along a central axis, C, of the detection arrangement by a distance, h. The first and second inner coils 30a, 30b are also wound from a single wire and are also spaced along the central axis, C, from each other by the distance z, such that the first inner coil 30a is substantially concentric to the first outer coil 28a and the second inner coil 30b is substantially concentric with the second outer coil 28b. The out-of-plane coil arrangements 28, 30 are oriented and configured to enable a measurement of the depth, d, of the metal body 13 beneath the surface 12a of the body 12 to be calculated from output signals measured across respective wire ends 29, 31 of the outer and inner coil arrangements 28, 30. Determination of the depth, d, of the metal body 13 is achieved by comparing the secondary magnetic field strength measured by the outer pair of coils 28a, 28b with the secondary magnetic field strength measured by the inner pair of coils 30a, 30b, as described in further detail below.

It will be appreciated that only the lower coils 28b, 30b are absolutely necessary to determine the depth, d. The main purpose of the upper coils 28a, 30a is to cancel the applied transmitter field, the signal from which would otherwise dominate the secondary field of the target It would be possible to use the detector with out the upper coils 28a, 30a particularly in pulse-induction mode. If only the lower coils 28b, 30b are provided, the transmitter coils 10 in FIG. 3, which are arranged to provide symmetric irradiaton of the upper and lower coil pairs, need only be wound over a reduced axial length to surround the lower coils 28b, 30b.

The first gradiometer 16, the second gradiometer 22 and the outer and inner out-of-plane coil pairs 28, 30 are aligned along the central axis, C, so as to define an access channel or passage 32 which extends through each one of the coils. The metal detection apparatus may also include a body marker (not shown), such as a pen, which may be passed through the access channel 32 to mark the surface 12a of the body 12 to identify the x-y position of the metal body 13 beneath the surface 12a.

FIG. 5 shows an output signal 33 from the first gradiometer 16 as a function of distance, y, in a plane horizontal to the surface 12a of the body 12, As the first gradiometer 16 is passed over the metal body 13 in the y direction, a null point will be reached to indicate that the metal body 13 is centred substantially directly below the current y position of the detection coil arrangement 14. The second gradiometer 22 also provides an output signal 35 of the form shown in FIG. 5 as the detection apparatus is passed over the metal body 13 in the x direction. Again, a null point is reached to indicate that the metal body 13 is x centred substantially directly below the current x position of the detection coil arrangement 14. When the detection apparatus 14 is moved to the x-y position at which both output signals 33, 35 are at their respective null points, it can be determined that the metal body 13 is directly below the current position of the apparatus.

The output signal from the first gradiometer 16 therefore provides an indication of a first direction, y, to the metal object 13 and the output signal from the second gradiometer provides an output signal representative of a second direction, x, to the metal object 13. By monitoring the output signals from the first and second gradiometers 16, 22 respectively, an accurate x-y location of the metal body 13 beneath the body surface 12a can therefore be determined. For the purpose of this specification, when the metal detection apparatus is moved into the position in which it is substantially directly above the metal body 13, as indicated by both of the output signals 33, 35 being at its respective null point, the apparatus shall be referred to as being in a "top-dead-centre" position.

For some types of metal target, particularly for example long needles at oblique angles, the null position will necessarily not be directly below the centre line of the detection coil arrangement 14. In such circumstances, the user may be required to experiment with the position and orientation of the detection coil arrangement 14 to obtain the most accurate indication of the top-dead-centre position.

FIG. 6 shows a schematic diagram of the processing arrangement which may be used to accurately locate the metal body 13 in three dimensions. The output signals 33, 35 from the first and second gradiometers 16, 22 respectively are supplied to amplifiers 38, 40 respectively, the outputs from which are input to a respective detector 39, 41. The detectors 39, 41 may be any that are used conventionally for c/w or p-i metal detectors, but a preferred embodiment will include phase sensitive detectors (PDSs), 39, 41, sometimes referred to as lock-in amplifiers or synchronous detectors/demodulators. The purpose of the amplifiers 38, 40 is to boost the output voltage across the gradiometer coils, 18a, 18b or 24a, 24b, to a level suitable for phase sensitive detection. The purpose of the PSDs 39, 41 is to detect the amplitude of the respective gradient signal at the frequency of the transmitted field, which is at some predetermined phase. Respective output signals 43, 45 from the PSDs 39, 41 are input to a respective y- or x-comparator unit 42, 44 associated with the first and second gradiometers 16, 22 respectively.

Each of the y-channel and x-channel comparator units 42, 44 has two threshold levels, a positive threshold level, +TH, and a negative threshold level, -TH. The function of each comparator unit 42, 44 is to compare the amplitude of its respective input signal 43 or 45 (as output from the associated PSD 39, 41) with each of its two threshold levels, +TH, -TH.

The comparator unit 42 for the y-channel has two associated light emitting diode (LED) elements, 46a, 46b, forming part of an LED array. Each of the two threshold levels of the y-channel comparator unit 42 is associated with one of the LED elements 46a, 46b in the array. If the amplitude of the input signal 43 exceeds a threshold level (of the same sign), a respective output signal, 142a or 142b, is generated and is used to illuminate the associated LED. In a similar manner, the x-channel comparator unit 44 compares the amplitude of the input signal 45 with each one of its two threshold levels and, if the amplitude of the input signal 45 exceeds the associated threshold level (of the same sign) a respective output signal, 144a or 144b, is used to illuminate an associated LED, 46c or 46d.

As can be seen more clearly in FIG. 7, the LED elements 46a, 46b, 46c, 46d associated with the first (y) and second (x) comparator units 42, 44 form an LED array of a display unit, referred to generally as 50. The display array 46a, 46b, 46c, 46d is arranged to indicate to the user the direction in which the detection apparatus should be moved towards the top-dead-centre position. The output signals 43, 45 derived from the PSDs 39, 41 associated with each of the first and second gradiometers 16, 22 respectively are also shown in FIG. 7, as are the threshold levels (shown as dashed lines, +TH, -TH) of the y- and x- channel comparator units 42, 44.

The processing arrangement in FIG. 6 also includes first and second amplifiers 54, 56 respectively for receiving respective output signals 58, 60 from the outer and inner coil sets 28, 30 respectively. The amplified signals from the amplifiers 54, 56 are input to respective ADCs 62, 64 which supply digital signals to a digital signal processing unit 66. The digital signal processing unit 66 typically takes the form of a computer capable of operating either an algebraic calculation or a look-up table routine.

The algorithm required to operate on the digital signal processing unit 66 is arranged to perform a depth calculation which is derived from the output signals 58, 60 of the inner and outer coil sets 28, 30. The calculated depth, d, of the metal object 13 is then displayed on the display unit 50 in a visual display element 68, as shown in FIG. 7. It would be understood by a person skilled in the art that the depth, d, can be determined from the ratio of the strengths of the secondary magnetic field output signals 58, 60 generated by the inner and outer coil pairs 30, 28.

The depth calculation performed by the digital signal processor may be carried out in real time when the apparatus is in use. Alternatively, the digital signal processor may be provided with a look-up table or data map of pre-stored calibration data relating the ratio of the secondary magnetic field strength measured by the outer pair of coils 28a, 28b with the secondary magnetic field strength measured by the inner pair of coils 30a, 30b to the depth, d, of the metal 13 beneath the body surface 12a.

The output signal from the amplifier 56 associated with the inner pair of coils 30a, 30b is also passed to a further detector 61 and further comparator unit 67, an output signal 67a from which is used to activate an additional LED element 46e in the event that the amplitude of the signal derived from the amplifier 56 exceeds an associated threshold level, +THR, of the further comparator unit 67. If the amplitude of the signal derived from the amplifier 56 does not exceed the threshold level, +THR, the LED element 46e in the array remains unilluminated. As can be seen in FIG. 7, the additional LED element 46e adopts a central position in the LED array.

In use, the surgeon or other user of the metal detection apparatus passes the apparatus over the surface 12a of the body 12 and can use the LED array 46a-46e as a guide to the x-y location of the metal body 13 beneath the body surface 12a. If, for example, the metal detection apparatus 14 is in the correct y-position for top-dead-centre (i.e. the output signal 43 derived from the first gradiometer 16 is at its null position), but the apparatus is positioned to the left (in the illustration shown in FIG. 7) of the metal body 13 in the x-direction, the LED element 46a will be illuminated as the threshold level, +TH, is exceeded by the amplitude of the output signal 45. Conversely, if the metal detection apparatus 14 is in the correct y-position for top-dead-centre but the apparatus is positioned to the right (in the illustration shown in FIG. 7) of the metal body 13 in the x-direction, the LED element 46b will be illuminated. Only when both the output signal 43 derived from the first gradiometer 16 and the output signal 45 derived from the second gradiometer 22 are at their respective null points are all of the elements 46a, 46b, 46c, 46d unilluminated. As described previously, the central LED element 46e is only illuminated when the signal derived from the amplifier of the inner pair of coils 30a, 30b exceeds a predetermined threshold level, +THR, the predetermined threshold level +THR being selected such that this condition is satisfied only when the coils 30a, 30b are relatively close to the top-dead-centre position. Thus, when the apparatus is moved to a position in which each one of the LED elements 46a, 46b, 46c, 46d is unilluminated, but the central LED element 46e is illuminated, the detection apparatus is in the top-dead-centre position.

It will be appreciated that the predetermined threshold level, +THR, associated with the further detector 61 and the further comparator unit 67 may have a level which is exceeded by the amplitude of the output signal from the amplifier 56, even in circumstances in which the apparatus is not top-dead-centre. Although the central LED element may therefore be illuminated when the apparatus is not top-dead-centre, this does not matter as the fact that one (or more) of the other elements 46a-46d is illuminated provides an indication to the user that the apparatus is not in the top-dead-centre position.

When the user has ascertained that the apparatus is in the top-dead-centre position from the LED display 46a-46e, the numerical display on the visual display element 68 informs the user of the depth beneath the surface 12a at this x-y location and the marker device is inserted through the access channel 32 to mark the surface 12a of the body 12 to indicate where an incision should be made.

It is preferable if the digital signal processing unit 66 is programmed only to calculate a depth, d, for the metal object 13 when the apparatus is in the top-dead-centre position as this reduces processing time and processing power.

Referring to FIGS. 8 and 9, if it is required to have an LED array with improved directional resolution, the LED array may have eight outer LED elements 48a-48h and a central LED element 48i. As can be seen in FIG. 8, in this embodiment of the invention the processing arrangement for the first and second gradiometers 16, 22 in FIG. 6 is also provided with a logic gate array 100 to which the output signals, 142a, 142b and 144a, 144b, from the first and second comparator units 42, 44 are input. The logic gate array 100 is configured such that the user is able to guide the apparatus to a top-dead-centre position above the metal body 13 in accordance with the visual indication provided by the display 50.

It would be understood by a person familiar with logic circuit design how the logic gate array 100 may be configured to provide illumination of the central LED element 48i only if the apparatus is in the top-dead-centre position. This is achieved by configuring the logic gate array 100 to provide output signals, for activating the LED elements 48a-48i, in accordance with a set of predetermined logic statements. By way of example, the logic gate array 100 may be configured such that the top left LED element 48a of the display 50 is illuminated if the amplitude of the output signal 45 exceeds the positive threshold (referred to as $+TH_{44}$) of the x comparator unit 44 and the amplitude of the output signal 43 exceeds the positive threshold level ($+TH_{42}$) of the y comparator unit 42 (i.e. logic $+TH_{42}$ AND $+TH_{44}$). In this case, LEDs 48b and 48d may be configured such that they are not to be illuminated. Similarly, the bottom right element 48h of the display 50 is illuminated if the amplitude of the output signal 43 is more negative than the negative threshold level ($-TH_{42}$) of the y comparator unit 42 and the amplitude of the output signal 45 is more negative than the negative threshold level ($-TH_{44}$) of the x comparator unit 44 (i.e. logic $-TH_{42}$ AND $-TH_{44}$). The middle right element 48e of the display 50 is illuminated if the following logic equation is satisfied;

$-TH_{44}$ NOT ($+TH_{42}$ OR $-TH_{42}$ OR $-TH_{44}$).

As described previously with reference to FIG. 6, the processing arrangement may be configured such that the central element 48i of the nine element array is illuminated if the strength of the amplified signal from the inner pair of coils 30a, 30b exceeds the predetermined threshold level, +THR, such that the user can determine that the apparatus is in the top-dead-centre position when each one of the LED elements 48a-48h is unilluminated but the central element 48i is illuminated.

To further aid the user in guiding the apparatus to the top-dead-centre position above the metal object 13, the LEDs of the array may be shaped in the form of arrow heads, bars, lines or other similar shapes representative of a direction.

It will be appreciated that the logic processing steps given by way of example above are only one way in which the LED array may be operated to provide the required visual indication of top-dead-centre position. Furthermore, it will be appreciated that the logic processing steps may be extended to accommodate an array with a greater number of display elements (e.g. 5×5, or 9×9) if higher resolution is required. In such cases, additional comparators would be required to provide multiple threshold level detection and further complex logic arrays would be required.

Referring to FIG. 10, in an alternative embodiment to that shown in FIG. 4, the first gradiometer 116 may be configured such that two coil halves 118a, 118b, which are wound from the same wire, define first and second part-circular areas which overlap, inwardly facing edges 119a, 119b of the first and second halves 118a, 118b respectively defining a clearance 120 through which the access channel 32 can extend. The second gradiometer may also be configured in this "overlapping" configuration. It will be appreciated that whether the gradiometers 16, 22 in FIG. 4 are in the "separated" configuration or the "overlapping" configuration will have no effect on the function of the apparatus, and so the first and second gradiometers 16, 22 may have different configurations. In practice, however, it may be preferable for both gradiometers 16, 22 to be of one configuration type.

The present invention provides a relatively inexpensive, lightweight and convenient metal detection apparatus for locating a metal object in a human or animal body. One particular advantage is that only one digital processing channel for the depth measurement is required, thereby reducing processing time and processor power requirements. The benefit derives from the fact that it is not necessary to determine a numerical calculation of the x-y location of the metal body 13. Instead, only a visual indication that the x-y location has been identified is needed, following which a depth calculation can be carried out to accurately locate the metal.

The invention claimed is:

1. An apparatus for detecting a metal object beneath a surface of a human or animal body comprises transmitter means for generating a magnetic field in the vicinity of the metal object, thereby to generate a secondary magnetic field, and detection means for detecting the secondary magnetic field, wherein the detection means include a first gradiometer having first and second gradiometer coils wound in opposite polarity to one another in series in a figure-of-eight configuration about a clearance region for providing a first output signal representative of a first direction, y, to the metal object, a second gradiometer having first and second gradiometer coils wound in opposite polarity to one another in series in a figure-of-eight configuration about a clearance region arranged substantially orthogonal to the first gradiometer for providing a second output signal representative of a second direction, x, to the metal object, the second direction being substantially orthogonal to the first direction and in the same plane as the first direction, an outer coil and an inner coil arranged to be substantially concentric with one another and each of which is arranged to provide an output signal representative of secondary magnetic field strength in a third direction, z, which is substantially orthogonal to the plane of the first and second directions, and processing means for comparing the output signal generated by the inner coil with the output signal generated by the outer coil so as to provide an indication of depth, d, of the metal object beneath the surface, the inner and outer coils and the clearance regions of the first and second gradiometers being arranged about a common axis in the third direction to define an access channel within which a device is received, for marking the surface of the body, the apparatus being capable of simultaneously indicating the depth of the metal object beneath the surface of the body and marking the surface there-above.

2. The apparatus as claimed in claim 1 said outer coil comprises an upper outer coil and a lower outer coil spaced apart in the third direction, and said inner coil comprises an upper inner coil and a lower inner coil, each of said coils arranged to be substantially concentric with a corresponding one of the upper or lower outer coils, each of the outer and inner coil sets providing an output signal representative of secondary field strength in the third direction.

3. The apparatus as claimed in claim 1, wherein the first gradiometer includes first and second gradiometer coils wound in a separated figure-of-eight configuration.

4. The apparatus as claimed in claim 1, wherein the first gradiometer includes first and second gradiometer coils wound in an overlapped figure-of-eight configuration.

5. The apparatus as claimed in claim 2, wherein the second gradiometer is oriented substantially orthogonally to the first gradiometer in the plane of the first gradiometer.

6. The apparatus as claimed in claim 5, wherein the coils of both the first and second gradiometers are wound in substantially the same overlapped or separated figure-of-eight configuration.

7. The apparatus as claimed in claim 6, wherein the transmitter means comprise means for generating an alternating magnetic field.

8. The apparatus as claimed in claim 6, wherein the transmitter means comprise means for generating a pulsed magnetic field.

9. The apparatus as claimed in claim 1, wherein the apparatus includes the device for marking the surface of the body.

10. The apparatus as claimed in claim 9, further comprising a display including an array of display elements for providing a visual indication of the position of the metal object in the x-y plane.

11. The apparatus as claimed in claim 10, wherein the display comprises an array of light emitting diodes (LEDs).

12. The apparatus as claimed in claim 11, wherein the LEDs are shaped in the form of arrows to further aid guidance of the user to move the apparatus to a top-dead-center position substantially vertically above the metal object.

13. The apparatus as claimed in claim 10, further comprising a first comparison means for comparing the output signal from the first gradiometer with substantially equal value positive and negative threshold levels and for generating first and second comparative output signals, and a second comparison means for comparing the output signal from the second gradiometer with substantially equal value positive and negative threshold levels and for generating first and second further comparative output signals, and means for activating the display elements in response to the comparative output signals to provide a visual indication of the distance to the metal object in an x-y plane.

14. The apparatus as claimed in claim 13, wherein the threshold levels associated with both the first and second gradiometers are substantially equal.

15. The apparatus as claimed in claim 14, further comprising a logic gate array for receiving the comparative output signals and for generating a plurality of output signals for activating the display elements in accordance with one or more predetermined logic statements.

16. The apparatus as claimed in claim 1, wherein the processing means comprises signal processing means for receiving each of the output signals from the inner and outer coils and for calculating the depth, d, of the metal object beneath the surface of the body.

17. The apparatus as claimed in claim 16, wherein the signal processing means is arranged to determine the depth, d, only when the metal detection apparatus is moved into a top-dead-center position.

18. The apparatus as claimed in claim 17, wherein the signal processing means is arranged to calculate the depth, d, in real time.

19. The apparatus as claimed in claim 17, further comprising a graphical display for displaying a numerical indication of the depth, d.

20. The apparatus as claimed in claim 16, wherein said signal processing means comprises a digital signal processor.

* * * * *